United States Patent
Broberg, III et al.

(10) Patent No.: US 6,381,648 B1
(45) Date of Patent: Apr. 30, 2002

(54) METHOD AND APPARATUS FOR FILTERING ETHERNET FRAMES

(75) Inventors: Robert Neal Carlton Broberg, III, Rochester; Paul B. Kubista, West Concord; Gerald David Miller, Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/306,231

(22) Filed: May 6, 1999

(51) Int. Cl.[7] .............................................. G06F 15/16
(52) U.S. Cl. ....................................... 709/232; 709/236
(58) Field of Search ................................ 709/201, 230, 709/232, 236; 370/471, 405, 409, 401, 255

(56) References Cited

U.S. PATENT DOCUMENTS 5,790,554 A * 8/1998 Pitcher et al. ............... 370/471
6,041,058 A * 3/2000 Flander et al. .............. 370/401
6,101,170 A * 8/2000 Doherty et al. ............. 370/255

* cited by examiner

Primary Examiner—Glenton B. Burgess
Assistant Examiner—Kenneth W. Fields
(74) Attorney, Agent, or Firm—Bracewell & Patterson, LLP

(57) ABSTRACT

Within a communication node, low level hardware is programmed and provided with filter data to accept broadcast frames. A high level layer of hardware, utilizing the pre-loaded, pre-defined comparison data, checks incoming frame header information. Based on pre-defined filter data or reference values loaded into low level registers, the high-level hardware will reject or accept submitted data communication frames. This method reduces the requirement for software to operate on each incoming frame header, thus reducing load on the processor.

6 Claims, 5 Drawing Sheets

METHOD AND APPARATUS FOR FILTERING ETHERNET FRAMES

BACKGROUND OF THE INVENTION

1. Technical Field

The present invention relates in general to data communication systems and in particular to networked data communications systems. More particularly, the present invention relates to a specific mode of data communication utilizing ethernet frame transportation. Still more particularly, the present invention relates to filtering broadcast frames on an ethernet network.

2. Description of the Related Art

Ethernet communications are accomplished by transporting digital communications in frames across a network of computers or "stations." A frame, the basic data transmission unit in bit oriented protocols, is a discrete group of data bits in a particular protocol, with flags to indicate a beginning and an end of the frame. The frame usually contains addressing and error checking information.

Data, that is being transmitted on an ethernet based network, is encapsulated by various network layers from the Application layer to the physical layer. As the data is received, the headers are stripped by the receiving station layers as the frame is passed from layer to layer in the receiving station. Included in the transport layer is a sequence number so that a file may be broken into multiple packets and recombined at the receiving end. The network layer provides the application to assemble datagrams into frames to be transmitted over the network to a receiving station.

On an Ethernet based network, stations are connected to a shared signaling system. All the ethernet signals are serially transmitted to every connected station. The header applied to data to be transmitted includes Medium Access Control (MAC) and consists of a preamble, destination address, source address and the data length segments of the frame.

A unique address (48 bits) is assigned to Ethernet cards as they are manufactured. As a frame is placed in the channel of an Ethernet medium, all connected Ethernet cards check the MAC for the destination address. The Ethernet card compares the destination address with the address it was manufactured with. Only the Ethernet card with the destination address will read the entire frame. All the other cards on the network will ignore the data in the frame when the other cards determine the address does not match with their manufacture installed address.

A problem with being on the Ethernet is that there are broadcasts happening all the time. At the lower levels of the ethernet hardware, all the connected cards read the broadcast. Many of the broadcasts don't need to be accepted by most of the connected cards, because the broadcast is for a particular card. Many ethernet card designs accept all broadcast frames and then filter out any errant frames in software. Utilizing software to accept or reject frames requires processing power, which delays the station processor from other uses.

It would be desirable to determine whether or not a frame was intended for a particular station at a much lower level in the frame transmission hierarchy to reduce the load on the receiving station's processor. If the acceptance or rejection of the frame takes place in hardware, the step of loading the frame in memory to compare the address of the frame to the address of the ethernet card may be eliminated and thus reduce processor loading.

SUMMARY OF THE INVENTION

It is therefore one object of the present invention to provide a method and system that will reduce the load on a microprocessor in a station (computer) connected to an ethernet network.

It is another object of the present invention to provide a method and apparatus for comparing frames broadcast on an ethernet network utilizing hardware.

It is yet another object of the present invention to provide a method and apparatus to filter out unwanted frames from ethernet traffic.

The foregoing objects are achieved as is now described. Within a communication node, low level hardware is programmed and provided with filter data to accept broadcast frames. A high level layer of hardware, utilizing the pre-loaded, pre-defined comparison data, checks incoming frame header information. Based on pre-defined filter data or reference values loaded into low level registers, the high-level hardware will reject or accept submitted data communication frames. This method reduces the requirement for software to operate on each incoming frame header, thus reducing load on the processor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
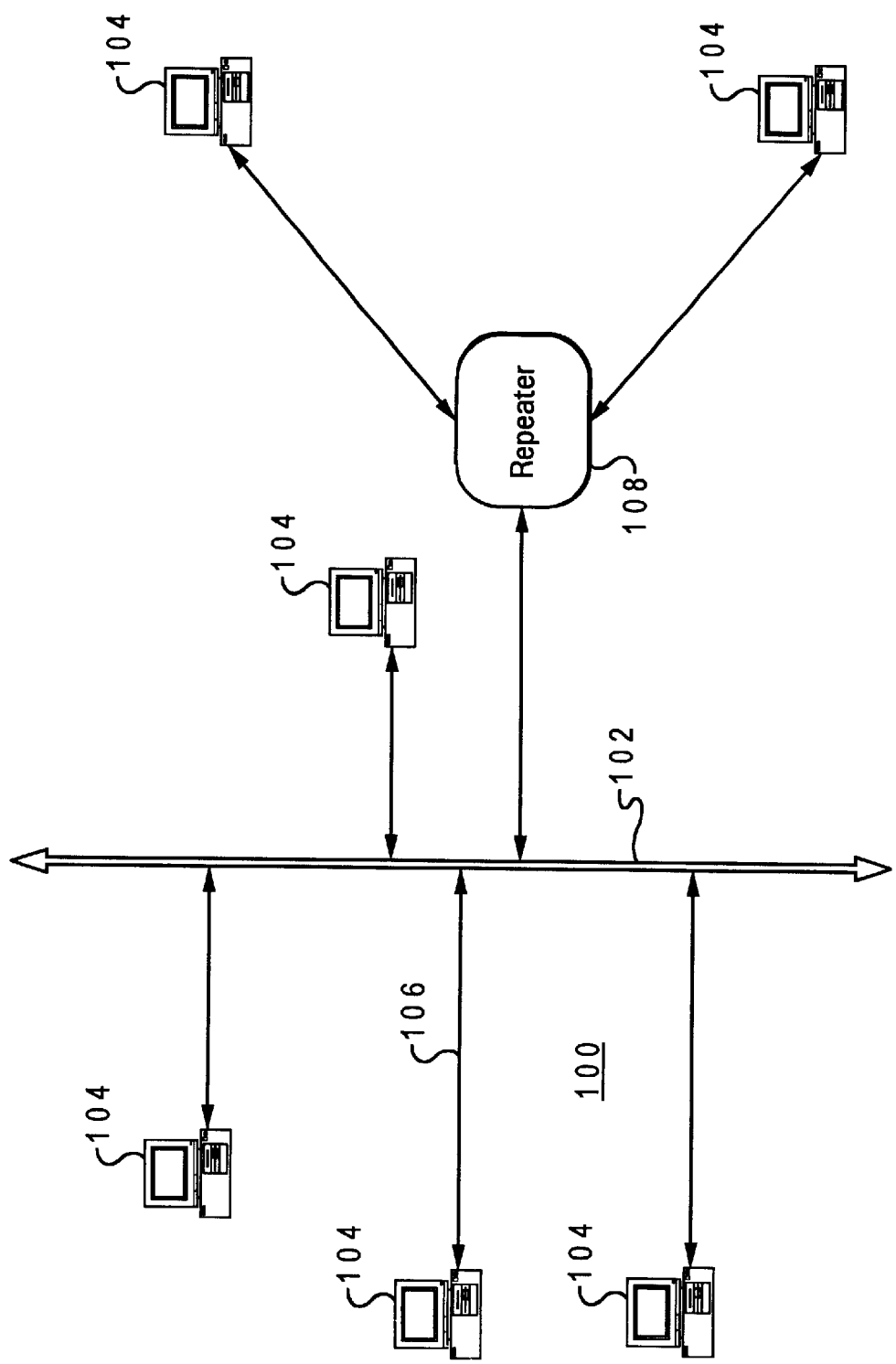
FIG. 1 depicts a high-level block diagram of an ethernet network in which a preferred embodiment of the present invention may be implemented.

With reference now to the figures, and in particular with reference to FIG. 1, a high-level block diagram of an ethernet network in which a preferred embodiment of the present invention may be implemented, is depicted. Network 100 comprises multiple stations 104 (computers, printers, terminals, servers, etc.) interconnected via a medium 102, which may comprise twisted pair, coaxial cable, fiber, etc. Each station 104 is equipped with an ethernet card (not shown) which has a unique address and operates independently of all other ethernet cards on the network. An extension of the network may connect network 100 with outside networks or with the Internet. Repeater 108, a signal amplifying and re-timing device, may be utilized to link multiple segments to form an extended network. A signal sent by any station 104 travels over all segments and is heard by all other stations over the Ethernet channel.

Figure 2:
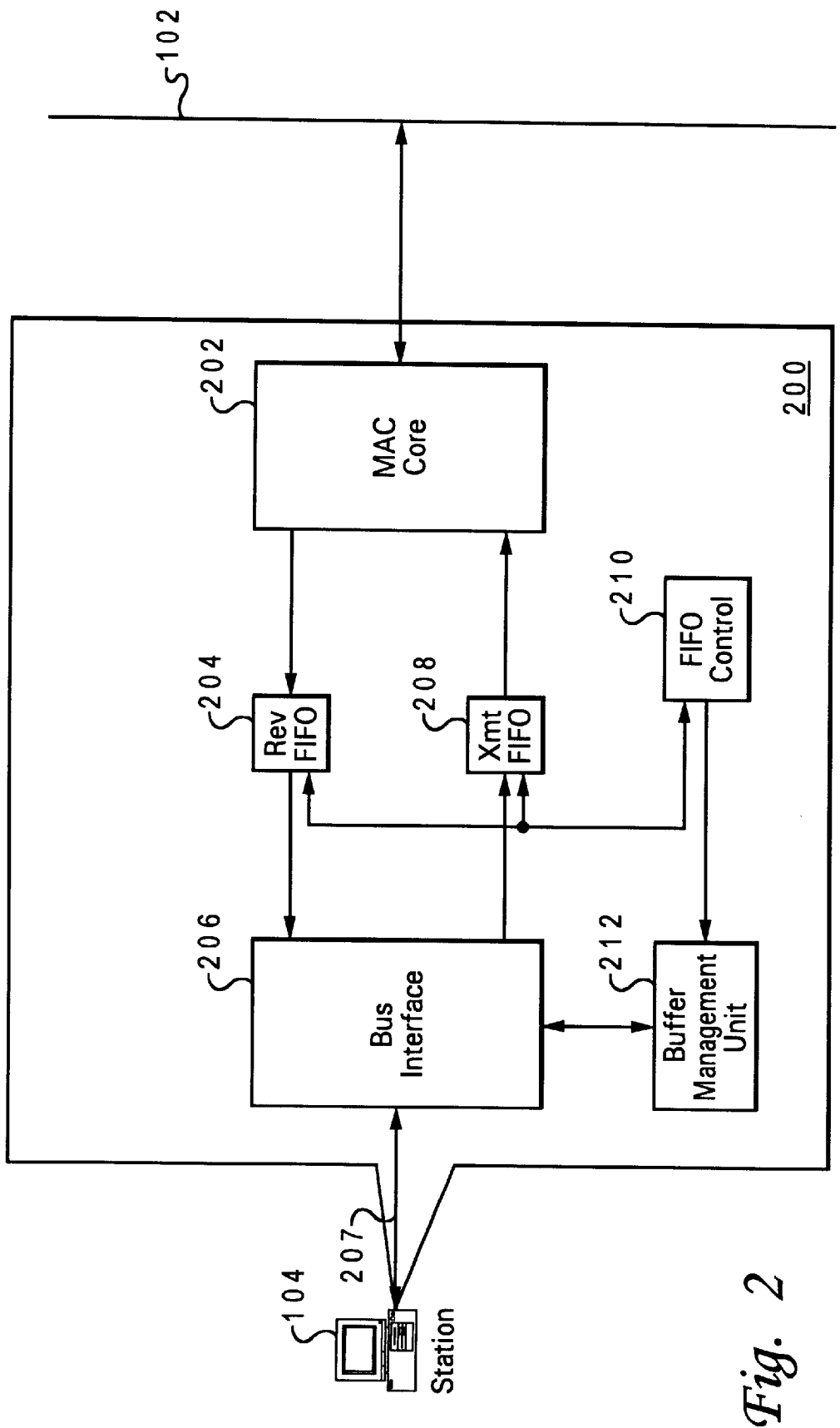
FIG. 2 illustrates a high-level block diagram of an ethernet controller, in accordance with a preferred embodiment of the present invention.

Referring to FIG. 2, a high-level block diagram of an ethernet controller in an ethernet network, in accordance with a preferred embodiment of the present invention, is illustrated. Ethernet chip 200, on board an ethernet controller (not shown) and contained within 104 comprises a number of components coupled between station 104 microprocessor and communications medium 102. All ethernet signals are transmitted over medium 102 to every connected station on the network. Within ethernet chip 200, Medium Access Control (MAC) core 202 is coupled with receive First In First Out (FIFO) 204 and transmit FIFO 208. Both FIFO 204 and FIFO 208 are coupled to FIFO control 210 and bus interface 206. Buffer management unit 212 is coupled with FIFO control 210 and bus interface 206. The ethernet controller receives data from either communications medium 102 or bus interface 206 and stores the data in FIFO memory. Data is then routed to station 104 via bus 207, receive FIFO 204 and bus interface 206 or transmit to communications medium 102 via FIFO 208 and MAC Core 202 until transmission is complete.

When any station transmits data on the network, a MAC header is attached to a data frame that is to be transmitted on ethernet medium 102 and includes a preamble, destination address, source address and data length segments within the frame. The header determines to which ethernet address, and thus a particular station, to transmit the data. Since every ethernet chip is assigned a unique address at manufacture, ethernet chip 200 compares the destination address of the MAC header on any data received by ethernet chip 200 to the ethernet chip 200 address. Only ethernet chip 200, with the required destination address will read the data frame and all other cards on the network will ignore the data in the frame. MAC core 202 reads the destination address and compares the address to its own unique address. If the destination address is the same as ethernet chip 200, MAC core 202 accepts and routes received data to receive FIFO 204. Receive FIFO 204 is controlled by FIFO control 210, as is transmit FIFO 208. Data is received into FIFO 204 memory and routed to bus interface 206, which is controlled by buffer management unit 212. Data is then sent to station 104.

Data generated by station 104 may be sent to bus interface 206 which routes to transmit FIFO 208. Under control of FIFO control 210, the data in transmit FIFO 208 memory is routed to MAC core 202 which adds the MAC header associated with ethernet chip 200 and then passes the data to ethernet medium 102.

The system and architecture depicted in FIG. 1 and FIG. 2 is provided solely for the purpose of illustrating and explaining the present invention, and is not meant to imply any architectural limitations. Those skilled in the art will recognize that many variations are possible. All such variations are within the spirit and scope of the present invention.

Figure 3:
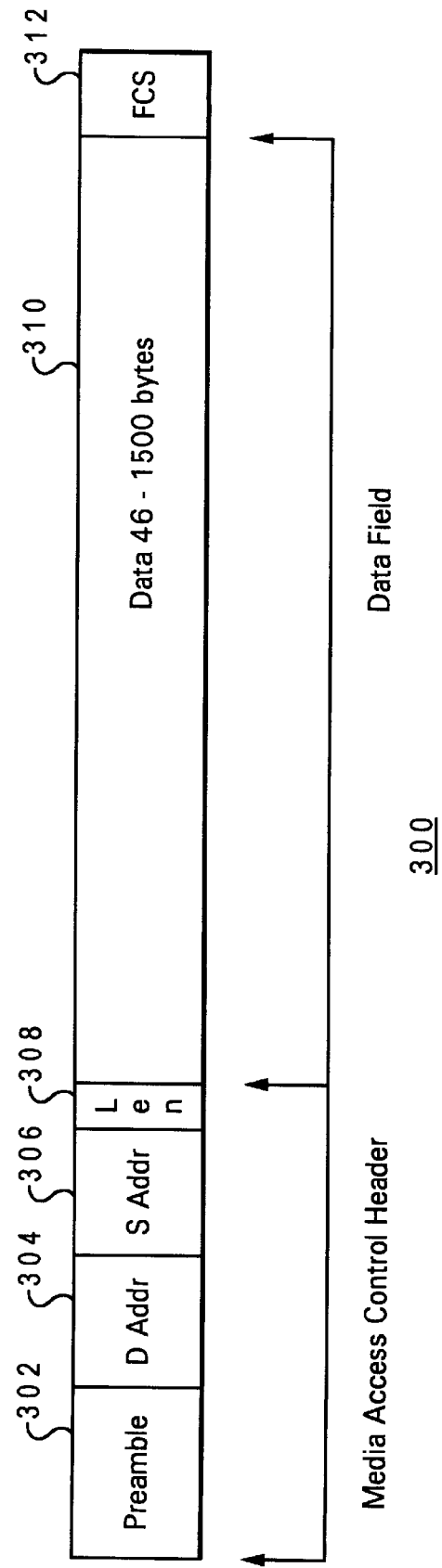
FIG. 3 depicts a block diagram of a frame for transmission on an ethernet network.

Referring to FIG. 3, a block diagram of a frame for transmission on an ethernet network, is illustrated. Frame 300 includes a 64 bit preamble field 302 that is used for synchronization; a 48 bit field, D addr 304, is used as the destination address of a receiving station; the ethernet address of the source host, S addr 306 is 48 bits in length and length 308 indicates the length of data included in the frame. On a Local Area Network ("LAN"), Data Field 310 would include data that was being transmitted in ethernet frame 300. Error detection is performed utilizing Frame Check Sequence (FCS) 312, a 32 bit field at the end of the frame.

Figure 4:
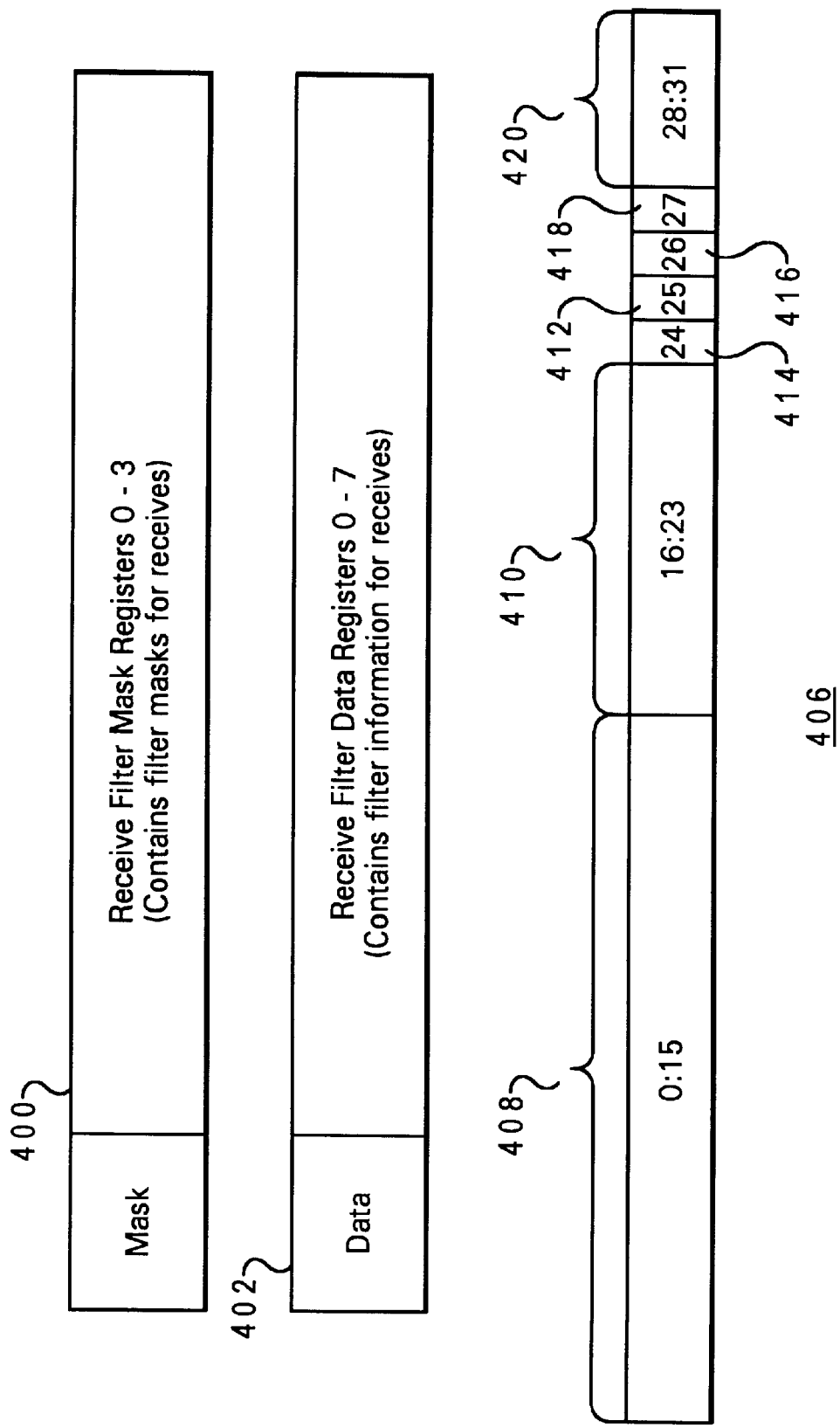
FIG. 4 depicts a high-level block diagram representing selected registers for operating on received frames in accordance with a preferred embodiment of the present invention.

Referring now to FIG. 4, a high-level block diagram representing selected registers for operating on received frames in accordance with a preferred embodiment of the present invention, is illustrated. Data received by the ethernet control card will be sent to selected registers on board the ethernet controller chip. The received data will logically 'anded' (anded or anding combines one value with another to arrive at a third value) with a number pre-loaded into Receive Filter Mask Registers 400 to arrive at a value to be compared to Receive Filter Data Registers 402. Receive Filter Mask Register 400 is compared to the first four (0–3) of Receive Filter Data Registers 402.

Receive Filter Data Registers 402 comprise, in this exemplary embodiment, eight registers. The first four registers, 0–4, as explained above are associated with Receive Filter Mask Registers 400. Receive Filter Control Registers 406, registers 4 through 7, contain filter information for data received. Reserved 408 (bits 0 through 15) is reserved. Offset 410 (bits 16 through 23) specifies at what point in the frame that the data will be compared. Bit 412 is a reserved bit. Offset Valid bit 414 determines whether a comparison will be done. If the bit is zero, no comparison will be done, but if the bit value is 1, a comparison will be done as the offset, specified in offset 410, is reached. Match bit 416 determines whether matching data is to be kept. If the value is 1, data that matches will be kept or thrown based on Keep bit (27) 418. If the value is 0, data that doesn't match will be kept.

The value of keep bit 418, determines whether data that satisfies match bit 416 will be thrown or kept. If the value of keep bit 418 is 0, data that satisfies match bit 416 will be thrown or disregarded. If the value of keep bit 418 is 1, data that satisfies match bit 416 will be kept. Pointer 420 is the value of registers 0–7 that offset valid bit 410 sets if conditions in the register are met. Pointer 420 is used for anything that depends on something later in the frame (programming code for filter registers and filter control is illustrated in Appendix A of this application).

Figure 5:
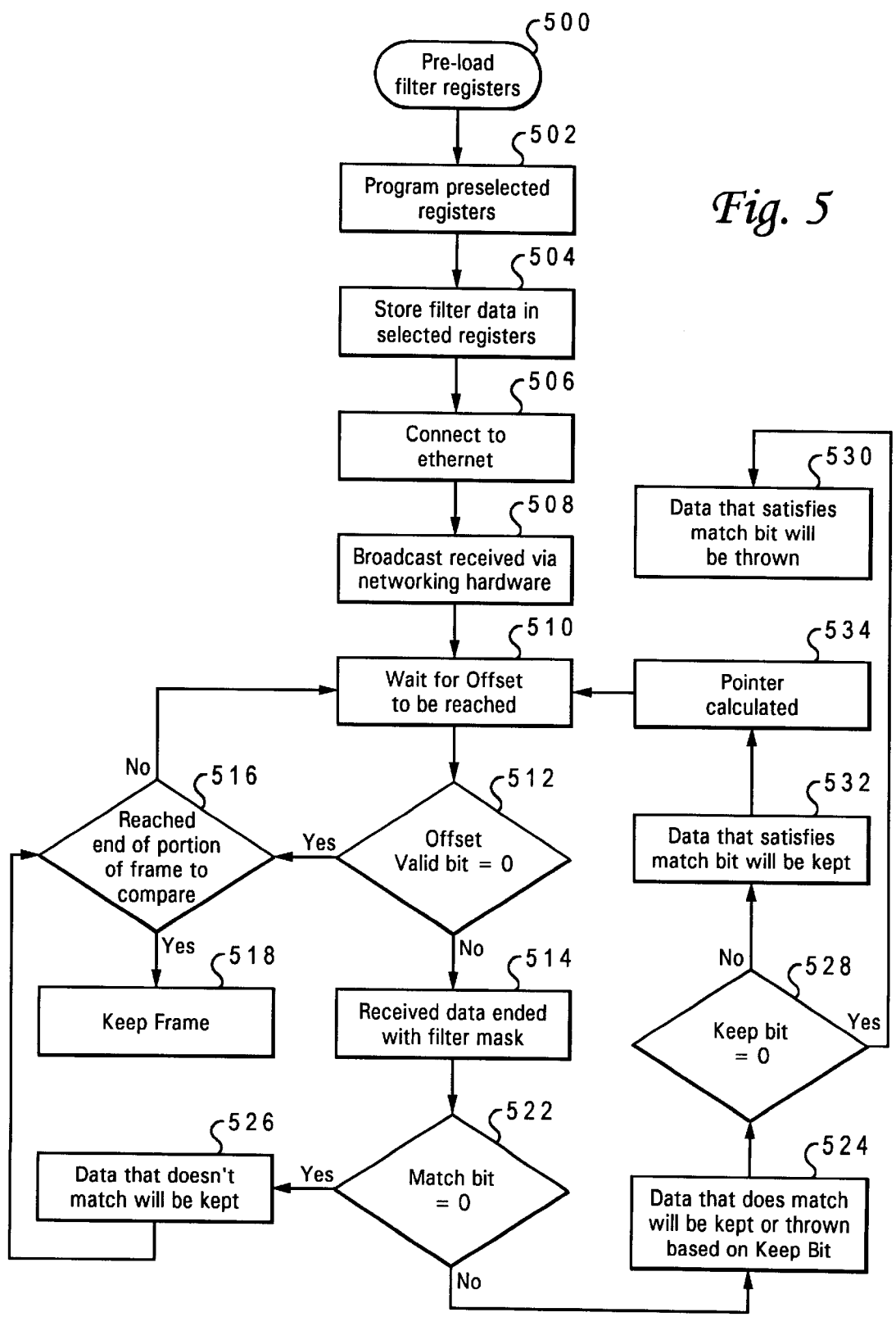
FIG. 5 is a high-level flow diagram of a method for filtering ethernet frames in accordance with a preferred embodiment of the present invention.

Referring to FIG. 5, a high-level flow diagram of a method for filtering ethernet frames in accordance with a preferred embodiment of the present invention, is depicted. As a station on a network is powered up, an application is loaded into selected ethernet controller chip registers, including filter data for comparing to incoming transmissions to determine whether or not to receive and retain data, contained in frames, received by the station. The process begins with step 500, which depicts information being pre-loaded into a first group of selected registers on board an ethernet controller chip (microprocessor) within a communication device on the network. The process continues to step 502, which illustrates programming code being loaded into a second group of registers on board the controller chip (Appendix A represents an example of programming code that may be utilized). The process then passes to step 504, which depicts filter information being stored in a third group of selected registers.

The process next proceeds to step 506, which illustrates the communication device connecting to an ethernet network. Next, the process passes to step 508, which depicts a broadcast being received by the communication device that has been sent by another communication device on the network. The process then proceeds to step 510, which illustrates the hardware waiting for an offset valid bit to be reached in the data frame. Then, the process continues to step 512, which depicts a determination of whether the offset valid bit is equal to zero. If the offset valid bit is equal to zero, the process proceeds to step 516, which illustrates a determination of whether the end of the frame portion being compared has been reached. If the end of the frame portion being compared has not been reached, the process returns to step 510 and repeats step 510 and 512. If the end of the frame portion being compared has been reached, the process passes instead to step 518, which depicts keeping the frame.

Returning to step 512, if the offset valid bit is not equal to zero, the process instead passes to step 514, which illustrates the second group of selected registers 'anding' (combining) the received broadcast data with the pre-loaded filter mask data. The process next passes to step 522, which illustrates a determination of whether a match bit equals zero. If the match bit equals zero, the process passes to step 526, which depicts a preliminary classification of the data as non-matching data and the data will be kept. The process then passes to step 516, which illustrates the determination of whether the end of the frame portion being compared has been reached.

Returning to step 522, if the match bit does not equal zero, the process instead proceeds to step 524, which illustrates classifying the data as matching and will be kept or thrown based on the status of the keep bit.

The process then proceeds to step 528, which depicts a determination of whether the keep bit equals zero. If the keep bit is equal to zero, the process proceeds to step 530, which illustrates the data being classified as satisfying the match bit and the data will be thrown or disregarded. If the keep bit is not equal to zero, the process instead proceeds to step 532, which depicts that data classified as satisfying the match bit will be kept. The process then passes to step 534, which depicts a pointer being calculated, which is the value of the Receive Filter Data Register (depicted in FIG. 4, Receive Filter Data registers 402) Offset Valid bit. The process then proceeds to step 510, which illustrates waiting for an offset bit to be reached.

Examples in the following table illustrate example filtering programming code that is be loaded into the selected ethernet controller chip registers to perform the indicated functions:

FILTERING EXAMPLES

Note: Assume that the source address is offset in the frame at byte number 6 where the first byte is 0.

Keep Things That Match Value

In order to keep that which matches 0x0123456789AB, the following would need to be set up in the selected registers in a processor:
write32(&chip_eblr_addr->bufr_filter_addr_1, 0xXXXX0123);
write32(&chip_eblr_addr->bufr_filter_ctl_1, 0x000004B7);
write32(&chip_eblr_addr->bufr_filter_mask_1, 0x0000FFFF);
write32(&chip_eblr_addr->bufr_filter_addr_7, 0x456789AB);
write32(&chip_eblr_addr->bufr_filter_ctl_7, 0x00000537);

Keep Things That Don't Match Value

In order to keep that which doesn't match a source address of 0X0BADDEADBEEF, the following would need to be set up in selected registers in the processor:
write32(&chip_eblr_addr->bufr_filter_addr_2, 0x00000BAD);
write32(&chip_eblr_addr->bufr_filter_ctl_2, 0x00000696);
write32(&chip_eblr_addr->bufr_filter_mask_2, 0x0000FFFF);
write32(&chip_eblr_addr->bufr_filter_addr_6, 0xDEADBEAF)
write32(&chip_eblr_addr->bufr_filter_ctl_6, 0x0000081F);

Discard Things That Don't Match Value

In order to discard that which doesn't match the upper two bytes of the source address of 0x0BADDEADBEEF, the following would need to be set up in selected registers in the processor:
write32(&chip_eblr_addr->bufr_filter_addr_0, 0xXXXX0BAD);
write32(&chip_eblr_addr->bufr_filter_ctl_0, 0x0000068F);
write32(&chip_eblr_addr->bufr_filter_mask_0, 0x0000FFFF);

Discard Things That Match Value

In order to discard that which matches the last two bytes of the source address of 0xBADDCAFE0123, the following would need to be set up in selected registers in the processor:
write32(&chip_eblr_addr->bufr_filter_addr_3, 0x00000123);
write32(&chip_eblr_addr->bufr_filter_ctl_3, 0x000004A3);
write32(&chip_eblr_addr->bufr_filter_mask_3, 0x0000FFFF The present invention by providing programming and comparison data in registers in an ethernet chip allows low level hardware to accept the broadcast frames, but a higher layer of hardware looks at the incoming frame header information and rejects or accepts the frame. Software programs the low level hardware to filter out whatever is desired in the header information of the frame. Further, software may be extended to include filtering out whatever is desired in the data section of the frame. Hardware, which is much faster than software, off-loads the software functions from the processor thus saving valuable processor time.

It is important to note that while the present invention has been described in the context of a fully functional data processing system and data communications network, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

APPENDIX A

```
------------------------------------------------------
-- Filter Registers
------------------------------------------------------
?GENERATE BEGIN x12 (0 to @ (filter_regs));
   ?with (BUFRDCRWrite and BUFRFilter<x12>RegSel) select
      BUFRFilter<x12>Reg_L1 (0 to 31) <= BUFR_dcrDataIn (0 to 31)
when '1',
                                            BUFRFilter<x12>Reg_L2 (0 to 31)
when others;
   ?with (BUFRDCRWrite and BUFRFilter<x12>RegSel) select
      BUFRFilter<x12>CtlReg_L1 (0 to 7) <= BUFR_dcrDataIn (0 to 7)          when
'1',
                                            BUFRFilter<x12>Reg_L2 (0 to 7) when
others;
   ?with BUFRFilterSet & BUFRFilterClear select
      BUFRFilter<x12>CtlReg_L1 (8) <=
          (((BUFRFilter0Ptr (0 to 3) = @hex(<x12>)) and
BUFRFilter0CtlReg_L1 (11)) or
          ((BUFRFilter1Ptr (0 to 3) = @hex(<x12>)) and
BUFRFilter1CtlReg_L1 (11)) or
          ((BUFRFilter2Ptr (0 to 3) = @hex(<x12>)) and
BUFRFilter2CtlReg_L1 (11)) or
          ((BUFRFilter3Ptr (0 to 3) = @hex(<x12>)) and
BUFRFilter3CtlReg_L1 (11)) or
          ((BUFRFilter4Ptr (0 to 3) = @hex(<x12>)) and
BUFRFilter4CtlReg_L1 (11)) or
          ((BUFRFilter5Ptr (0 to 3) = @hex(<x12>)) and
BUFRFilter5CtlReg_L1 (11)) or
          ((BUFRFilter6Ptr (0 to 3) = @hex(<x12>)) and
BUFRFilter6CtlReg_L1 (11)) or
          ((BUFRFilter7Ptr (0 to 3) = @hex(<x12>)) and
BUFRFilter7CtlReg_L1 (11)))     when "10",
          '0'
          when "01",
          BUFRFilter<x12>CtlReg_L2 (8).
          when others;
      BUFRFilter<x12>CtlReg_L1 (9) <= BUFRFilter<x12>CtlReg_L2 (9);
      ?with (BUFRDCRWrite and BUFRFilter<x12>RegSel) select
         BUFRFilter<x12>CtlReg_L1 (10) <= BUFR_dcrDataIn (10)        when '1',
                                            BUFRFilter<x12>Reg_L2 (10)    when
others;
      ?with BUFRFilterSet & BUFRFilterClear & BUFRFilter<x12>OffsetActive &
BUFRFilter<x12>CtlReg_L1 (10) select
         BUFRFilter<x12>CtlReg_L1 (11) <=
         (BUFRFilter<x12>Masked (0 to 31) = BUFRFrameData (0 to 31))        when
"1010",
         (BUFRFilter<x12>Masked (0 to 31) /= BUFRFrameData (0 to 31))       when
"1011",                                                                    when
          '0'
"-1--",
          BUFRFilter<x12>CtlReg_L2 (11)                                    when
others;
      ?with (BUFRDCRWrite and BUFRFilter<x12>RegSel) select
         BUFRFilter<x12>CtlReg_L1 (12 to 15) <= BUFR_dcrDataIn (12 to 15)
      when '1',
                                            BUFRFilter<x12>Reg_L2 (12 to 15)
      when others;
?GENERATE END;
?GENERATE BEGIN x14 (0 to @(mask_regs));
      ?with (BUFRDCRWrite and BUFRFilter<x14>MaskRegSel) select
         BUFRFilter<x14>MaskReg_L1 (0 to 31) <= BUFR_dcrDataIn (0 to 31)
         when '1',
                                            BUFRFilter<x14>MaskReg_L2 (0 to
31)    when others;
?GENERATE END;
------------------------------------------------------
-- Filter Control
------------------------------------------------------
?signal BUFRFilterSet;
?signal BUFRFilterClear;
BUFRFilterSet    <= BUFRFirstFillBLock_L1;
BUFRFilterClear <= BUFREndOfFirstBlock:
?GENERATE BEGIN x2 (0 to @(filter_regs));
      ?signal BUFRFilter<x2>OffsetActive;
      BUFRFilter<x2>OffsetActive <= (BUFRFilter<x2>CtlReg_L2 (0 to 7) =
BUFRFillPtr_L2 (0 to 7) and
                                            BUFRFilter<x2>OffsetV;
?GENERATE END;
?GENERATE BEGIN x3 (0 to @(mask_regs));
```

APPENDIX A-continued

```
    ?signal BUFRFilter<x3>Masked (0 to 31);
    BUFRFilter<x3>Masked (0 to 31) <= BUFRFilter<x3>Reg_L2 (0 to 31) and
BUFRFilter<x3>MaskReg_L2 (0 to 31);
?GENERATE END;
?GENERATE BEGIN x4 (@(mask_regs+1) to @(filter_regs));
    ?signal BUFRFilter<x4>Masked (0 to 31);
    BUFRFilter<x4>Masked (0 to 31) <= BUFRFilter<x4>Reg_L2 (0 to 31);
?GENERATE END;
?signal BUFRKeepFrame;
BUFRKeepFrame <=   (((not (BUFRFilter0Match) and BUFRFilter0Keep) and
                     (not (BUFRFilter1Match) and BUFRFilter1Keep) and
                     (not (BUFRFilter2Match) and BUFRFilter2Keep) and
                     (not (BUFRFilter3Match) and BUFRFilter3Keep) and
                     (not (BUFRFilter4Match) and BUFRFilter4Keep) and
                     (not (BUFRFilter5Match) and BUFRFilter5Keep) and
                     (not (BUFRFilter6Match) and BUFRFilter6Keep) and
                     (not (BUFRFilter7Match) and BUFRFilter7Keep) and
                   ((BUFRFilter0Match and BUFRFilter0Keep) or
                    (BUFRFilter1Match and BUFRFilter1Keep) or
                    (BUFRFilter2Match and BUFRFilter2Keep) or
                    (BUFRFilter3Match and BUFRFilter3Keep) or
                    (BUFRFilter4Match and BUFRFilter4Keep) or
                    (BUFRFilter5Match and BUFRFilter5Keep) or
                    (BUFRFilter6Match and BUFRFilter6Keep) or
                    (BUFRFilter7Match and BUFRFilter7Keep) or
                   BUFRNoMatchOnly))
                   or not (BUFRFiltering);
```

What is claimed is:

1. In a communications network, a method for filtering communications data, comprising the steps of:

programming a plurality of selected registers within a communications device, including:

pre-loading a calculated figure in a first group of selected registers of said plurality of selected registers; and pre-loading filter information in a plurality of selected filter data registers;

anding incoming communications data with said pre-loaded calculated figure to obtain a result;

comparing said result to said pre-loaded filter information; and rejecting or accepting said communications data according to said pre-loaded filter information.

2. The method of claim 1, further comprising;

loading filter information, for data received, into a third group of selected registers within said plurality of selected registers; and comparing said received data filter information to said filter data in a second group of selected registers.

3. In a communications network, a system for filtering communications data, comprising:

a plurality of selected registers within a communications device, including:

a first group of selected registers wherein a calculated value is loaded; and a plurality of selected filter data registers wherein filter information is pre-loaded;

logic circuitry for anding incoming communications data with said pre-loaded calculated figure to obtain a result;

comparison circuitry for comparing said result to said pre-loaded filter information; and logic circuitry for rejecting or accepting said communications data according to said pre-loaded filter information.

4. The system of claim 3, further comprising a third group of selected registers within said plurality of selected registers for loading data received filter information.

5. In a communications network, a computer program product within a computer-readable medium having instructions for filtering communications data, comprising:

instructions within said computer readable medium for programming a plurality of registers within a communications device, including:

instructions within said computer readable medium for pre-loading a calculated figure in a first group of selected registers within said plurality of registers; and instructions within said computer readable medium for pre-loading filter information in a plurality of selected filter data registers; and instructions within said computer readable medium for anding incoming communications data with said pre-loaded calculated figure;

instructions within said computer readable medium for comparing result of said anding calculation to said pre-loaded filter information; and instructions within said computer readable medium for rejecting or accepting said communications data according to said pre-loaded filter information.

6. The computer program product of claim 5, further comprising;

instructions within said computer readable medium for loading filter information, for data received, into a third group of selected registers within said plurality of selected registers; and instructions within said computer readable medium for comparing said received data filter information to said filter data in a second group of selected registers.

* * * * *